(12) United States Patent
Law (10) Patent No.: US 9,944,800 B2
(45) Date of Patent: Apr. 17, 2018

(54) UV CURABLE HYDROPHILIC COATINGS

(71) Applicant: EMPIRE TECHNOLOGY DEVELOPMENT LLC, Wilmington, DE (US)

(72) Inventor: Kock-Yee Law, Penfield, NY (US)

(73) Assignee: Empire Technology Development LLC, Wilmington, DE (US)

(*) Notice: Subject to any disclaimer, the term of this patent is extended or adjusted under 35 U.S.C. 154(b) by 577 days.

(21) Appl. No.: 14/523,458

(22) Filed: Oct. 24, 2014

(65) Prior Publication Data
US 2016/0230015 A1    Aug. 11, 2016

(51) Int. Cl.

| | | |
|---|---|---|
| C08F 2/46 | (2006.01) | |
| C08F 2/50 | (2006.01) | |
| C08G 61/04 | (2006.01) | |
| C09D 5/00 | (2006.01) | |
| C09D 129/10 | (2006.01) | |
| C09D 7/00 | (2018.01) | |
| C08J 3/24 | (2006.01) | |
| C08J 3/28 | (2006.01) | |
| B05D 3/06 | (2006.01) | |
| B05D 1/02 | (2006.01) | |
| B05D 1/28 | (2006.01) | |
| C09D 4/06 | (2006.01) | |
| C08K 5/06 | (2006.01) | |

(52) U.S. Cl.
CPC ............... *C09D 5/00* (2013.01); *B05D 1/02* (2013.01); *B05D 1/28* (2013.01); *B05D 3/067* (2013.01); *C08J 3/24* (2013.01); *C08J 3/28* (2013.01); *C09D 4/06* (2013.01); *C09D 7/001* (2013.01); *C09D 129/10* (2013.01); *C08J 2329/10* (2013.01); *C08K 5/06* (2013.01)

(58) Field of Classification Search
CPC ........ C09D 5/00; C09D 129/10; C09D 7/001; C09D 4/06; C08K 5/06; C08J 3/28; C08J 3/24; C08J 2329/10; B05D 1/02; B05D 3/067; B05D 1/28
USPC .......................................... 522/178, 1; 520/1
See application file for complete search history.

(56) References Cited

U.S. PATENT DOCUMENTS

| | | | |
|---|---|---|---|
| 4,072,770 A | | 2/1978 | Ting |
| 4,694,029 A | * | 9/1987 | Land ................ C08F 2/50 522/121 |
| 5,093,038 A | | 3/1992 | Durand |
| 5,889,076 A | | 3/1999 | Dones et al. |
| 2002/0028303 A1 | * | 3/2002 | Bahadur ............ C08F 283/12 427/508 |
| 2003/0134939 A1 | | 7/2003 | Vuarnoz et al. |
| 2012/0027342 A1 | | 2/2012 | Yoshida et al. |
| 2012/0177928 A1 | * | 7/2012 | You ............... G02B 1/043 428/412 |
| 2013/0177849 A1 | | 7/2013 | Takeyama et al. |
| 2013/0274433 A1 | | 10/2013 | Endo et al. |

FOREIGN PATENT DOCUMENTS

| | | |
|---|---|---|
| EP | 0814116 A1 | 12/1997 |
| EP | 2147957 A1 | 1/2010 |
| WO | WO 94/03505 A1 | 2/1994 |
| WO | 9858988 A1 | 12/1998 |
| WO | 0188003 A1 | 11/2001 |
| WO | WO2006/098676 A1 | 9/2006 |

OTHER PUBLICATIONS

Armour et al., Encyclopedia of Polymer Science and Engineering, vol. 11, Peroxy Compounds to Polyesters, John Wiley & Sons, Apr. 14, 1988, pp. 186-210.
Barthlott et al., Purity of the sacred lotus, or escape from contamination in biological surfaces, *Planta* (1997), 202:1-8.
Benfarhi et al., Synthesis of clay Nanocomposite materials by light-induced crosslinking polymerization, *European Polymer Journal* (2004), 40:493-501.
Chikuni et al., Light-induced amphiphilic surfaces, *Nature* (Jul. 31, 1997), 388:431-432.
Crivello et al., Synthesis of Epoxy Monomers That Undergo Synergistic Photopolymerization by a Radical-Induced Cationic Mechanism, *Journal of Polymer Science: Part A: Polymer Chemistry* (2001), 39:3578-3592.
Crivello et al., Free Radical Induced Acceleration of Cationic Photopolymerization, *Chem. Mater.* (Oct. 29, 1998), 10:3724-3731.
Crivello, The Discovery and Development of Onium Salt Cationic Photoinitiators, *Journal of Polymer Science: Part A: Polymer Chemistry* (1999), 37:4241-4254.
Decker et al., Photoinitiated polymerization of vinyl ether-based systems, *Progress in Organic Coatings* (2001), 42:253-266.
Decker et al., Photocrosslinking of Functionalized Rubber. II. Photoinitiated Cationic Polymerization of Epoxidized Liquid Natural Rubber, *Journal of Polymer Science: Part A: Polymer Chemistry* (1995), 33:2759-2772.
Fujishima et al., $TiO_2$ photocatalysis and related surface phenomena, *Surface Science Reports* (2008), 63:515-582.
Hattori et al., Ultrathin $SiO_x$ Film Coating Effect on the Wettability Change of $TiO_2$ Surfaces in the Presence and Absence of UV Light Illumination, *Journal of Colloid and Interface Science* (2000), 232:410-413.
Hoyle, Photocurable Coatings, Chapter 1, *American Chemical Society* (Dec. 28, 1990), pp. 1-16.
Lapin, Radiation-Induced Cationic Curing of Vinyl-Ether-Functionalized Urethane Oligomers, Chapter 26, *American Chemical Society* (Dec. 28, 1990).

(Continued)

Primary Examiner — Jessica Whiteley
(74) Attorney, Agent, or Firm — Pepper Hamilton LLP (57) ABSTRACT

UV curing hydrophilic coating compositions and methods to make and use the compositions are disclosed. The compositions include about 40 wt. percent to about 95 wt. percent of a vinyl ether compound, an epoxide compound, a compound with vinyl ether and epoxy functional groups, or any combination thereof; about 0.1 wt. percent to about 40 wt. percent of at least one polar diluent; about 40 wt. percent or less of at least one non-polar diluent; and about 0.5 wt. percent to about 12 wt. percent of at least one photoinitiator.

23 Claims, 1 Drawing Sheet

(56) References Cited

OTHER PUBLICATIONS

Negishi et al., Preparation of Transparent $TiO_2$ Thin Film Photocatalyst and Its Photocatalytic Activity, *Chemistry Letters* (1995), 841-842.
Neinhuis, Characterization and Distribution of Water-repellent, Self-cleaning, Plant Surfaces, *Annals of Botany* (1997), 79:667-677.
Rajaraman et al., Novel Hybrid Monomers Bearing Cycloaliphatic Epoxy and 1-Propenyl Ether Groups, *Macromolecules* (Dec. 17, 1998), 32:36-47.
Shirai et al., Photoacid and Photobase Generations: Chemistry and Applications to Polymeric Materials, *Prog. Polym. Sci.* (1996), 21:1-45.
Tripathy et al., Photoinitiated Polymerization of Acrylate, Methacrylate, and Vinyl Ether End-Functional Polyisobutylene Macromonomers, *Journal of Polymer Science: Part A. Polymer Chemistry* (Oct. 9, 2012), 51:305-317.
Verho et al., Mechanically Durable Superhydrophobic Surfaces, *Advanced Materials* (2011), 23:673-678.
Wang et al., Studies of Surface Wettability Conversion on TiO2 Single-Crystal Surfaces, *J. Phys. Chem. B* (Mar. 4, 1999), 103:2188-2194.
Wenzel, Resistance of Solid Surfaces to Wetting by Water, *Industrial and Engineering Chemistry* (Aug. 1936), 28(8):988-994.
Xiu et al., Mechanically robust superhydrophobicity on hierarchically structured Si surfaces, *Nanotechnology* (Mar. 23, 2010), 21:155705, pp. 1-5.
Aeroxide® TiO2 P 25, Accessed at http://web.archive.org/web/20140724080908/http://www.novochem.ro/letoltes/aeroxide%20tio2%20p25%20en.pdf pp. 2 (Feb. 2007).
Brunner , UV-Curing Ink Systems, accessed at http://www.coates.de/sne/uvinks.pdf accessed on Oct. 28, 2014, pp. 1-3.
High Lights! Radiation curing with resins and photoinitiators for industrial coatings and graphic arts: Laromer and Irgacure, BASF Technical Brochure, accessed at http://www.basf.com/group/corporate/en_GB/literature-document:/Brand+Darocur-Brochure--High+lights+Radiation+curing+with+resins+and+photoinitiators+for+industrial+coatings+and+graphic+arts+Laromer+Irgacure+Lucirin+Darocur-English.pdf accessed on Oct. 28, 2014, pp. 1-44.
HP Scitex UV Curable Inks, Accessed at ftp://ftp.hp.com/pub/printers/HP_Exstream/Whte_paper_Curable_links_US_Lo_no_disc-1.pdf, pp. 8 (May 2008).
Jones et al., Surface Treatment, Wetting and Modulus of Silicone Hydrogel, *Contact Lens Monthly* (Sep. 1, 2006), 232(6067):28-34.
Noren et al., Mechanical Properties of UV-Cured Coatings Containing Multifunctional Acrylates, In Radiation Curing of Polymeric Materials, Chapter 19, *ACS Symposium Series, American Chemical Society* (Dec. 28, 1990), 417:258-271.
Platzer, Encyclopedia of polymer science and engineering, vol. 11, by Mark, Bikales, Overberger, and Menges, Eds., Wiley-Interscience, John Wiley & Sons., New York, 1988, 829 pp, *Journal of Polymer Science Part C: Polymer Letters* (Jan. 15, 1989) 27(1):41-42.
Samuel et al., Study of Wetting and Adhesion Interactions between Water and Various Polymer and Superhydrophobic Surfaces, *J. Phys. Chem. C* (Jun. 27, 2011),115(30):14852-14861.
Smith, Tables of Polymer Surface Characteristics, Accessed at https://web.archive.org/web/20140816014038/http://www.accudynetest.com/polymer_tables.html Aug. 15, 2014, pp. 1-2.
Ultraviolet , Wikipedia, Accessed at https://web.archive.org/web/20141026163715/http://en.wikipedia.org/wiki/Ultraviolet last modified on Oct. 25, 2014, pp. 1-19.
Wang et al., Light Induced Amphiphilic Surfaces, *Nature* (Jul. 31, 1997), 388:431-432.
Watanabe et al., Photocatalytic Activity and Photoinduced Hydrophilicity of Titanium Dioxide Coated Glass, *Thin Solid Films* (Aug. 30, 1999), 351(1-2): 260-263.
Extended European Search Report for European Application No. EP 15190759.9 dated Apr. 5, 2016, pp. 7.

\* cited by examiner

UV CURABLE HYDROPHILIC COATINGS

BACKGROUND

The wettability of a solid surface is commonly measured by contact angle (CA). The contact angle of a liquid on a flat surface is the result of three different types of surface tension at the solid/liquid/gas interface, and is measured by Young's equation. Hydrophilicity of a solid surface refers to a contact angle less than 90° while hydrophobicity refers to a contact angle higher than 90°. If the contact angle is less than 10°, the surface is often designated as hydrophilic, provided that the surface do not react or dissolve in the water.

Paints and coatings, while protecting the substrate from external environment, themselves get dirty. The dirt dulls the coating by increasing the light scattering or by modifying the color of the coating. The dirt also affects the durability of a paint. A hydrophilic surface would allow water to spread out in a thin pool, sweeping dirt off the surface as the water puddles or thins out and trickles away. This type of "self-cleaning" behavior is advantageous to an exterior paint, as it keeps the coating clean without requiring extensive cleaning.

SUMMARY

The present disclosure provides UV curable paints and coatings with hydrophilic properties. In an embodiment, a hydrophilic coating composition includes about 40 wt. percent to about 95 wt. percent of a vinyl ether compound, an epoxide compound, a compound with vinyl ether and epoxy functional groups, or any combination thereof; about 0.1 wt. percent to about 40 wt. percent of at least one polar diluent; about 40 wt. percent or less of at least one non-polar diluent; and about 0.5 wt. percent to about 12 wt. percent of at least one photoinitiator, and wherein the coating is configured to have polar groups covering about 1 percent to about 10 percent of a coated surface after being cured.

In an additional embodiment, a method of modifying a surface to a hydrophilic surface involves applying a coating composition to the surface to form a coated surface, wherein the coating composition comprises about 40 wt. percent to about 95 wt. percent of a vinyl ether compound, an epoxide compound, a compound with vinyl ether and epoxy functional groups, or any combination thereof. The coating may further include about 0.1 wt. percent to about 40 wt. percent of at least one polar diluent, about 40 wt. percent or less of at least one non-polar diluent, and about 0.5 wt. percent to about 12 wt. percent of at least one photoinitiator. The method may further include exposing the coated surface to UV light to cure the coating, wherein the cured coating has polar groups covering about 1 percent to about 10 percent of the coated surface, and wherein the cured coating has a water contact angle of less than 20°.

In a further embodiment, a coated article includes a substrate and a coating disposed on at least one surface of the substrate, wherein the coating comprises about 40 wt. percent to about 95 wt. percent of a vinyl ether compound, an epoxide compound, a compound with vinyl ether and epoxy functional groups, or any combination thereof. The coating composition may further include about 0.1 wt. percent to about 40 wt. percent of at least one polar diluent, about 40 wt. percent or less of at least one non-polar diluent, and about 0.5 wt. percent to about 12 wt. percent of at least one photoinitiator. In some embodiments, the polar groups may cover about 1 percent to about 10 percent of a coated surface.

DETAILED DESCRIPTION

This disclosure is not limited to the particular systems, devices and methods described, as these may vary. The terminology used in the description is for the purpose of describing the particular versions or embodiments only, and is not intended to limit the scope.

The present disclosure provides UV curable paints and coatings with hydrophilic properties. In some embodiments, a hydrophilic coating composition includes about 40 wt. percent to about 95 wt. percent of a vinyl ether compound, an epoxide compound, a compound with vinyl ether and epoxy functional groups, or any combination thereof; about 0.1 wt. percent to about 40 wt. percent of at least one polar diluent; about 40 wt. percent or less of at least one non-polar diluent; and about 0.5 wt. percent to about 12 wt. percent of at least one photoinitiator.

In some embodiments, the vinyl ether compound may be a vinyl ether monomer, an oligomeric vinyl ether, and any combination thereof. In some embodiments, the vinyl ether compounds may be high molecular weight compounds, having a molecular weight from about 400 grams/mol to about 50,000 grams/mol. These high molecular weight compounds may be semi-solid, solid, or very viscous. Non-limiting examples of such vinyl ether compounds include polyether vinyl ether, a polyacrylate vinyl ether, a polyester vinyl ether, a polycarbonate vinyl ether, a polybutadiene vinyl ether, a polyisobutylene vinyl ether, a polyisopropylene vinyl ether, a polyurethane vinyl ether, a polyimide vinyl ether, a polyamide vinyl ether, a polyphosphazene vinyl ether, a siloxane vinyl ether, and any combination thereof.

In some embodiments, any cationic reactive vinyl ether compound may also be used in the coating composition. Examples of vinyl ether compounds that may be used include, but are not limited to, tri(ethylene glycol)divinyl ether, glycidyl vinyl ether (GVE), butanediol vinyl ether, di(ethylene glycol)divinyl ether, 1,4-cyclohexanedimethanol divinyl ether, 4-(1-propenyloxymethyl)-1,3-dioxolan-2-one, 2-chloroethyl vinyl ether, 2-ethylhexyl vinyl ether, ethyl vinyl ether, n-propyl vinyl ether, isopropyl vinyl ether, n-butyl vinyl ether, isobutyl vinyl ether, octadecyl vinyl ether, cyclohexyl vinyl ether, butanediol divinyl ether, hydroxybutyl vinyl ether, cyclohexanedimethanol monovinyl ether, tert-butyl vinyl ether, tert-amyl vinyl ether, dodecyl vinyl ether, ethylene glycol divinyl ether, ethylene glycol monovinyl ether, hexanediol divinyl ether, hexanediol monovinyl ether, diethylene glycol monovinyl ether, triethyleneglycol methyl vinyl ether, tetraethylene glycol divinyl ether, trimethylolpropane trivinyl ether, aminopropyl vinyl ether, poly-tetrahydrofuran divinyl ether, pluriol-E200 divinyl ether (PEG200-DVE), ethylene glycol butyl vinyl ether, 2-diethylamino ethyl vinyl ether, dipropylene glycol divinyl ether, octadecyl vinyl ether, a vinyl ether terminated aromatic ester monomer, a vinyl ether terminated aliphatic ester monomer, a vinyl ether terminated aliphatic urethane oligomer, a vinyl ether terminated aromatic urethane oligomer, and any combination thereof.

Suitable vinyl ether monomers that may be used are ethyl vinyl ether, propyl vinyl ether, isobutyl vinyl ether, octadecyl vinyl ether, hydroxybutyl vinyl ether, dodecyl vinyl ether, cyclohexyl vinyl ether, 2-ethylhexyl vinyl ether, butyl vinyl ether, ethyleneglycol monovinyl ether, diethyleneglycol divinyl ether, butanediol monovinyl ether, butane diol divinyl ether, hexanediol divinyl ether, ethylene glycol butylvinyl ether, triethylene glycol methylvinyl ether, cyclohexane dimethanol monovinyl ether, cyclohexane dimethanol divinyl ether, 2-ethylhexyl vinyl ether, and any combinations thereof.

The vinyl ether compounds disclosed herein may be present in the coating composition from about 40 wt. percent to about 95 wt. percent, about 40 wt. percent to about 75 wt. percent, about 40 wt. percent to about 65 wt. percent, or about 40 wt. percent to about 55 wt. percent. Specific examples include about 40 wt. percent, about 50 wt. percent, about 60 wt. percent, about 70 wt. percent, about 80 wt. percent, about 90 wt. percent, about 95 wt. percent, and ranges between (and including the endpoints of) any two of these values.

In some embodiments, the epoxide compound may be an epoxide monomer, an oligomeric epoxide, an epoxy resin, an epoxy material, or any combination thereof. In some embodiments, the epoxide compounds may be high molecular weight compounds, having a molecular weight from about 400 grams/mol to about 50,000 grams/mol. Non-limiting examples of epoxide compounds include 4-epoxycyclohexyl-methyl-3',4'-epoxycyclohexanecarboxylate, neopentylglycol di(4-methy-3,4-epoxy-cyclohexanecarboxylate), 4-benzyoxymethylcyclohexane oxide, diglycidyl ether of bisphenol A, 3,4-epoxycyclohexylmethyl-3,4-epoxycyclohexene carboxylate, 3,4-epoxy-6-methylcyclohexyl-methyl-3,4-epoxy-6-methyl-cyclohexene carboxylate, bis(3,4-epoxy-6-methylcyclohexyl-methyl)adipate, bis(2,3-epoxycyclopentyl)ether, 1,4-butanediol diglycidyl ether, resorcinol diglycidyl ether, bis(3,4-epoxycyclohexyl)adipate, 2-(3,4-epoxycyclohexyl-5,5-spiro-3,4-epoxy)cyclohexane-meta-dioxane, 1,2-epoxy-3-phenoxypropane, epoxidized 1,2,3-tris(1-propenoxy)propane, epoxidized polybutadiene, benzyl 3,4-epoxycyclohexylmethyl ether, 3,4-epoxycyclohexylcarboxaldehyde dibenzyl acetal, and any combination thereof.

Readily available epoxy materials can be used in the coating composition. Such epoxy materials include octadecylene oxide, epichlorohydrin, styrene oxide, vinyl cyclohexene oxide, glycidol, glycidylmethacrylate, diglycidyl ether of bisphenol A, 3,4-epoxycyclohexyl-methyl-3,4-epoxycyclohexene carboxylate, 3,4-epoxy-6-methylcyclohexylmethyl-3,4-epoxy-6-methyl-cyclohexene carboxylate, bis(3,4-epoxy-6-methylcyclohexylmethyl)adipate, bis(2,3-epoxycyclopentyl)ether, aliphatic epoxy modified from polypropylene glycol, dipentene dioxide, epoxidized polybutadiene, silicone resin containing epoxy functionality, halogenated epoxy resins, 1,4-butanediol diglycidyl ether of phenolformaldehyde novolak, resorcinol diglycidyl, bis(3,4-epoxycyclohexyl)adipate, 2-(3,4-epoxycyclohexyl-5,5-spiro-3,4-epoxy)cyclohexane-meta-dioxane, vinylcyclohexene monoxide 1,2-epoxyhexadecane, alkyl glycidyl ethers such as alkyl $C_8$-$C_{10}$ glycidyl ether, alkyl $C_{12}$-$C_{14}$ glycidyl ether, butyl glycidyl ether, cresyl glycidyl ether, p-ter butyl-phenyl glycidyl ether, polyfunctional glycidyl ethers, diglycidyl ether of neopentyl glycol, diglycidyl ether of cyclohexanedimethanol, trimethylol ethane triglycidyl ether, trimethylol propane triglycidyl ether, polyglycidyl ether of an aliphatic polyol, polyglycol diepoxide, bisphenol F epoxides, 9,9-bis[4-(2,3-epoxypropoxy)-phenyl]fluorenone, and any combination thereof.

Blends of various epoxy materials are also contemplated in this coating composition. Such blends include epoxy resins having two or more weight average molecular weight distributions. They may include low molecular weight (below 200), intermediate molecular weight (about 200 to 10,000) and higher molecular weight (above about 10,000) epoxy resins. Alternatively or additionally, the epoxy material may contain a blend of epoxy compounds having different chemical natures, such as aliphatic and aromatic, or having different functionalities, such as polar and non-polar. Other cationically polymerizable polymers can additionally be incorporated, if desired.

The epoxide compounds disclosed herein may be present in the coating composition from about 40 wt. percent to about 95 wt. percent, about 40 wt. percent to about 75 wt. percent, about 40 wt. percent to about 65 wt. percent, or about 40 wt. percent to about 55 wt. percent. Specific examples include about 40 wt. percent, about 50 wt. percent, about 60 wt. percent, about 70 wt. percent, about 80 wt. percent, about 90 wt. percent, about 95 wt. percent, and ranges between (and including the endpoints of) any two of these values.

In some embodiments, the compounds with both vinyl ether and epoxy functional groups that may be used in the coating composition include, but not limited to, 2-methylvinyl 3',4'-epoxycyclohexylmethyl ether, 2-methylvinyl 3',4'-epoxy-6'-methylcyclohexylmethyl ether, 2-methylvinyl 3'-methyl-3',4'-epoxycyclohexyl-dimethylmethyl ether, 2-methylvinyl 5',6'-epoxy-2'-norbornylmethyl ether, and any combination thereof.

The compounds with vinyl ether and epoxy functional groups disclosed herein may be present in the coating composition from about 40 wt. percent to about 95 wt. percent, about 40 wt. percent to about 75 wt. percent, about 40 wt. percent to about 65 wt. percent, or about 40 wt. percent to about 55 wt. percent. Specific examples include about 40 wt. percent, about 50 wt. percent, about 60 wt. percent, about 70 wt. percent, about 80 wt. percent, about 90 wt. percent, about 95 wt. percent, and ranges between (and including the endpoints of) any two of these values.

In some embodiments, the coating composition may also include diluents. These diluent monomers may undergo polymerization when exposed to UV irradiation. Usually diluents are lower in molecular weight in nature, and may be used to thin-down the vinyl ether and epoxide compounds and to adjust the surface tension to make the formulated coating coatable. In some embodiments, the diluent may be a mixture of polar and non-polar diluents. By using such mixtures, one can control the amount of surface polar groups on the cured coating while achieving the desirable viscosity at the same time.

In some embodiments, the polar diluent may be a low molecular weight vinyl ethyl monomer with at least one polar functional group, a low molecular weight epoxide monomer with at least one polar functional group, and any combination thereof. Non-limiting examples of polar diluents include 1,4-butanediol mono vinylether, ethylene glycol mono vinyl ether, diethylene glycol mono vinyl ether, 4-(hydroxylmethyl)cyclohexylmethyl vinyl ether, glycidol, N-vinyl pyrrolidone, N-vinyl caprolactam, vinyl imidazole, vinyl methyacetamide, and any combination thereof. The polar diluents may be present in the coating composition from about 0.1 wt. percent to about 40 wt. percent, about 0.1 wt. percent to about 30 wt. percent, about 0.1 wt. percent to about 20 wt. percent, or about 0.1 wt. percent to about 10 wt. percent. Specific examples include about 0.1 wt. percent, about 1 wt. percent, about 5 wt. percent, about 10 wt. percent, about 20 wt. percent, about 30 wt. percent, about 40 wt. percent, and ranges between (and including the endpoints of) any two of these values.

In some embodiments, non-polar diluents may also be used. Specific examples include cyclohexene oxide, 1,2-epoxyhexane, 1,2-epoxyoctane, 1,2-epoxydecane, 1,2-epoxyhexadecane, 1,2-epoxyoctadecane, epichlorohydrin, styrene oxide, ethyl vinyl ether, n-butyl vinyl ether, isobutyl vinyl ether, t-butyl vinyl ether, cyclohexyl vinyl ether, 2-ethylhexyl vinyl ether, 1,4-butanediol divinylether, and any combination thereof. The non-polar diluent may be optionally present in the composition from about 40 wt. percent or less, about 30 wt. percent or less, about 20 wt. percent or less, or about 1 wt. percent or less. percent. Specific examples include about 0.1 wt. percent, about 1 wt. percent, about 5 wt. percent, about 10 wt. percent, about 20 wt. percent, about 30 wt. percent, about 40 wt. percent, and ranges between (and including the endpoints of) any two of these values. In some embodiments, the non-polar diluents may be absent in the coating composition.

In some embodiments, the coating composition may also include photoinitiators. In some embodiments, the photoinitiators may be cationic photoinitiators. These compounds are highly thermally stable and upon irradiation liberate strong Broensted acids of the HX type which are capable of initiating subsequently the cationic polymerization of the epoxy rings or vinyl ether groups. The polymerization is initiated by the formation of a carbonium ion under the influence of the Broensted acid. The carbonium ion can react under chain propagation with further epoxy rings and/or with double bonds of vinyl ether groups.

Figure 1:
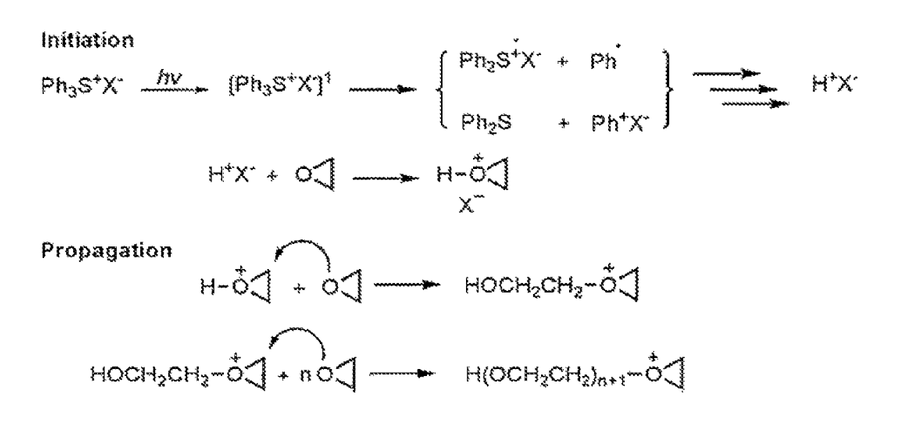
FIG. 1 depicts a schematic diagram of a cationic photoinitiator dependent polymerization according to an embodiment.

FIG. 1 shows an example of photogeneration of the photoacid (HX) by irradiating a triarylsulfonium salt. The photoacid then reacts with an epoxide compound to start the polymerization reaction. If the epoxide is bifunctional and a mixture of polymerizable monomers is present in the solution, this polymerization reaction will lead to a cross-linked polymer film. Similar cationic polymerization processes occur for the vinyl ether monomers.

Non-limiting examples of cationic photoinitiators include a diaryliodonium salt, a triarylsulphonium salt, a triarylselenonium salt, a dialkylphenacylsulphonium salt, an aryloxydiarylsulphoxonium salt, a dialylphenacylsulphoxonium salt, and any combination thereof. Other cationic photoinitiators include (4-n-octyloxyphenyl)phenyliodonium hexafluoroantimonate, (4-n-undecyloxyphenyl)phenyliodonium hexafluoroantimonate, bis(4-dodecylphenyl)iodonium hexafluoroantimonate, iodonium(4-methylphenyl)[4-(2-methylpropyl)phenyl]-hexafluorophosphate(1-), tris(4-alkylphenyl)sulfonium hexafluorophosphate, and any combination thereof.

The photoinitiators may be present in the coating composition from about 0.5 wt. percent to about 12 wt. percent, about 0.5 wt. percent to about 10 wt. percent, about 0.5 wt. percent to about 5 wt. percent, or about 0.5 wt. percent to about 1 wt. percent. Specific examples include about 0.5 wt. percent, about 1 wt. percent, about 5 wt. percent, about 10 wt. percent, about 12 wt. percent, and ranges between (and including the endpoints of) any two of these values.

In some embodiments, the coating composition may also include filler particles to increase the hydrophilicity and the roughness of the coated surface. Non-limiting examples of fillers include silica, aluminium oxide, clay, zinc oxide, titanium dioxide, tin oxide and the like. Suitable fillers include silica aluminium oxide and clay due to their high hydrophilicity. Suitable clay materials include Montmonillonite K10 and KSF, modified Montmonillonite K10, Bentonite, Nanomer I-30E, and the like. In some embodiments, it is desirable to modify the clay with a dispersant, such as hexadecyltrimethylammonium chloride, a hydroxyl vinylether monomer, or a hydroxyl epoxide monomer to increase the dispersity of the filler materials in the coating solution. In some embodiments, the fillers may be added to the coating solution by stirring, milling, ultrasonic assisted stirring, or by other techniques known in the art. The fillers may be present in the coating composition from about 2 wt. percent to about 40 wt. percent, about 2 wt. percent to about 30 wt. percent, about 2 wt. percent to about 20 wt. percent, or about 2 wt. percent to about 10 wt. percent. Specific examples include about 2 wt. percent, about 5 wt. percent, about 10 wt. percent, about 20 wt. percent, about 40 wt. percent, and ranges between (and including the endpoints of) any two of these values.

A paint, according to the disclosure, may further include one or more pigments. The term "pigments" is intended to embrace, without limitation, pigmentary compounds employed as colorants, including white pigments, as well as ingredients commonly known in the art as "opacifying agents" and "fillers". Pigments may be any particulate organic or inorganic compound and may provide coatings the ability to obscure a background of contrasting color (hiding power). Suitable pigments include Pigment Red 57:1, Irgalite Blue, NGA, Paliogen Violet 5100, Paliogen Violet 5890, Heliogen Green L8730, Lithol Scarlet D3700, Sunfast Blue 15:4, Hostaperm Blue B2G-D, Permanent Red P-F7RK, Hostaperm Violet BL, Lithol Scarlet 4440, Bon Red C, Oracet Pink RF, Paliogen Red 3871 K, Sunfast Blue 15:3, Paliogen Red 3340, Sunfast Carbazole Violet 23, Lithol Fast Scarlet L4300, Sunbrite Yellow 17, Sunbrite Yellow 747, Heliogen Blue L6900 and L7020, Spectra Pac C Orange 16, Heliogen Blue K6902 and K6910, Heliogen Blue D6840 and D7080, Sunfast Magenta 122, Sundan Blue OS, Neopen Blue FF4012, PV Fast Blue B2G01, Irgalite Blue BCA, Paliogen Blue 6470, Paliogen Orange 3040, Paliogen Yellow 152 and 1560, Lithol Fast Yellow 0991 K, Sudan Orange, Sudan Orange 220, Novoperm Yellow FGL, Lumogen Yellow D0790, Suco-Yellow L1250, Suco-Yellow D1355, Suco Fast Yellow D1 355 and D1 351, Hostaperm Pink E02, Hansa Brilliant Yellow SGX03, Permanent Yellow GRL 02, Permanent Rubine L6B OS, Fa Permanent Red P-F7RK, Fanal Pink 04830, Cinquasia Magenta, Paliogen Black L0084, Pigment Black K801, carbon black Regal 330, carbon black 5250, carbon black 5750, mixture thereof, and the like.

The pigment may be present in the coating composition from about 2 wt. percent to about 10 wt. percent, about 2 wt. percent to about 8 wt. percent, about 2 wt. percent to about 6 wt. percent, or about 2 wt. percent to about 4 wt. percent. Specific examples include about 2 wt. percent, about 4 wt. percent, about 6 wt. percent, about 8 wt. percent, about 10 wt. percent, and ranges between (and including the endpoints of) any two of these values.

The coatings disclosed herein are hydrophilic coatings and are configured to have polar groups on the coated surface after being cured. The number or the amount of polar groups on the surface of the cured coating may determine the hydrophilicity of the coating. For example, polar groups covering about 1 percent to about 10 percent of the coated surface may be optimal to provide the hydrophilic property to the coating. Too many polar or OH groups may drive them underneath the surface due to "hydrophobic interactions." In contrast, too little polar groups will be insufficient to drive the water contact angle to less than 20°.

For polymers with too many polar groups, hydrophobic interaction may become dominant during the film forming step, which will drive the polymer bulk, the hydrophobic material, to the air-solid interface. A small amount of roughness can be introduced to the polymer surface. This can be done by optimizing the coating and drying condition as well as through the filler and pigment in the formulation of the present invention. With the slight surface roughness, the water contact angle will be even lower, less than 10°, enabling super-hydrophilicity.

In some embodiments, the polar group on the coated surface may be an amide, a carboxyl, a carbonyl, a hydroxyl, or any combination thereof. For example, in some embodiments, the polar functional groups may include amide (—C(O)NH$_2$), $C_1$-$C_{10}$ alkyl amide, carboxylic acid (—COOH), $C_1$-$C_{10}$ alkyl carboxylic acid, hydroxyl (—OH), $C_1$-$C_{10}$ alkyl hydroxyl, $C_1$-$C_{10}$ alkyoxy, aldehyde (—C(O)H), $C_1$-$C_{10}$ alkyl aldehyde, ketone (—C(O)CH$_3$), $C_1$-$C_{10}$ alkyl ketone, epoxide, carbonyl group, and combinations thereof. The polar groups described herein may come from various components of the coating, such as polar diluents, vinyl ether compounds, epoxide compounds, compounds with both vinyl ether and epoxy functional groups, or any combination thereof. In some embodiments, the polar groups may cover about 1 percent to about 10 percent, about 1 percent to about 8 percent, about 1 percent to about 6 percent, about 1 percent to about 4 percent, or about 1 percent to about 2 percent of the coated surface, and ranges between (and including the endpoints of) any two of these values.

The coating disclosed herein, when cured, forms a hydrophilic surface, and the hydrophilic surface may have a contact angle of less than 20°, less than 18°, less than 16°, less than 14°, less than 12°, less than 10°, and ranges between (and including the endpoints of) any two of these values.

In additional embodiments, the coating composition may further contain one or more additives. These additives may alter properties of the paint made from the coating composition, such as shelf life, application and longevity, and health and safety. Such additives may be added, for example, during the manufacture of emulsion polymers in the paint or during the formulation of the paint itself. Illustrative additives may include rheology modifiers, preservatives, and the like.

In some embodiments, thickeners and rheology modifiers may also be added to coating compositions to achieve desired viscosity and flow properties. Thickeners form multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the coating compositions.

In some embodiments, one or more preservatives may be added in the coating compositions in low doses to protect against the growth of microorganisms. Preservatives, such as methyl benzisothiazolinones, chloromethylisothiazolinones, barium metaborate and 1-(3-chloroallyl)-3,5,7-triaza-1-azoniaadamantane chloride, may be used.

In some embodiments, the coating composition may further contain one or more of the following additives: plasticizers, surfactants and the like. Surfactants may be used, for example, to create the micelles for particle formation, as well as long-term particle stabilization. Surfactants may provide stability through electrostatic and steric hindrance mechanisms. Both ionic and non-ionic surfactants may be used. Examples may include, but are not limited to, alkyl phenol ethoxylates, sodium lauryl sulfate, dodecylbenzene sulfonate, polyoxyethylene alkyl ethers, polyoxyethylene alkyl allyl ethers, acetylene glycols, polyoxyethylene, stearic acid, and polyoxypropylene.

Coalescing agents, such as ester alcohols, benzoate ethers, glycol ethers, glycol ether esters and N-methyl-2-pyrrolidone, may be added to the coating compositions. Coalescing agents may be added to, for example, insure film formation under varying atmospheric conditions. They may also act as a temporary plasticizer, allowing film formation at temperatures below the system's glass transition temperature. After film formation, the coalescing agents may slowly diffuse to the surface and evaporate, increasing the hardness and block resistance of the film.

In some embodiments, one or more plasticizers may be added to the compositions to adjust the tensile properties of the paint film. Plasticizers include, for example, a glucose-based derivative, a glycerine-based derivative, propylene glycol, ethylene glycol, phthalates and the like.

Due to environmental regulations, it is desired to limit the amount of organic solvents in the paint as they are known to cause irreversible damage to the environment upon release. Traditionally, the vehicle used for paints has been organic solvents such as methyl ethyl ketone, toluene, methylene chloride and the like. Thus, there are limitations with respect to the quantity of organic solvent that can be present in a coating. It is desired that new paint and coating formulations disclosed release very few solvents into the atmosphere. In some embodiments, the coating composition described herein may not include a solvent. Further, in other embodiments, the coating composition may not include a volatile solvent.

After mixing the ingredients described herein, the UV curable coating is ready to use or it can be stored in the dark. For indoor or in an industrial setting, the paint can be applied on any intended surfaces or structures by the conventional coating technique, such as spray, roll, brush, web, dip and so on. The coated film can be cured with a suitable UV source or sunlight. Source of UV radiation may be any conventional UV radiation sources, such as Xe arc lamp, Hg arc lamp, UV LED, or any combination thereof. The UV radiation may have a wavelength of about 200 nanometers to about 400 nanometers, about 200 nanometers to about 350 nanometers, about 200 nanometers to about 300 nanometers, or about 200 nanometers to about 250 nanometers. Specific examples of wavelengths include about 200 nanometers, about 250 nanometers, about 300 nanometers, about 350 nanometers, about 400 nanometers, and ranges between (and including the endpoints of) any two of these values. The coated surface may be exposed to UV radiation for about for about 5 minutes to about 5 hours, for about 5 minutes to about 4 hours, for about 5 minutes to about 3 hours, for about 5 minutes to about 2 hours, or for about 5 minutes to about 1 hour. Specific examples of exposure times include about 5 minutes, about 30 minutes, about 1 hour, about 2 hours, about 3 hours, about 4 hours, about 5 hours, and ranges between (and including the endpoints of) any two of these values. The exposure to UV radiation may be continuous or may be intermittent or pulsed.

The coating may be used as a decorative coating, an industrial coating, a protective coating, a self-cleaning coating, a biocidal coating, or any combination thereof. The coatings may generally be applied to any substrate. The substrate may be an article, an object, a vehicle or a structure. Although no particular limitation is imposed on the substrate to be used in the present disclosure, exemplary substrates include exterior of a building, vehicles, bridges, airplanes, metal railings, fences, glasses, plastics, ceramics, wood, stones, cement, fabric, paper, leather, walls, pipes, vessels, medical devices, kitchen appliances, kitchen cabinets, outdoor furniture, aluminum siding, metal products, washing machines, ships, chemical plants, automobiles, farm implements, containers, floor surfaces, and the like. The coating may be applied to a substrate by spraying, dipping, rolling, brushing, or any combination thereof.

Also disclosed herein are methods to modify a surface to hydrophilic surface. In some embodiments, a method of modifying a surface to a hydrophilic surface involves applying a coating composition to the surface to form a coated surface, wherein the coating composition comprises about 40 wt. percent to about 95 wt. percent of a vinyl ether compound, an epoxide compound, a compound with vinyl ether and epoxy functional groups, or any combination thereof. The coating may further include about 0.1 wt. percent to about 40 wt. percent of at least one polar diluent, about 40 wt. percent or less of at least one non-polar diluent, and about 0.5 wt. percent to about 12 wt. percent of at least one photoinitiator. The method may further include exposing the coated surface to UV light to cure the coating, wherein the cured coating has polar groups covering about 1 percent to about 10 percent of the coated surface, and wherein the cured coating has a water contact angle of less than 20°.

EXAMPLES

Example 1

Preparation of a Hydrophilic Coating

A hydrophilic coating is prepared having the following components: 30 grams of vinylether compound (polyisobutylene vinyl ether), 20 grams of epoxide compound (neopentylglycol di(4-methy-3,4-epoxycyclo-hexanecarboxylate)), 30 grams of polar diluent (1,4-butanediol mono vinylether), 15 grams of filler particles (aluminum oxide), 2 grams of pigment (Irgalite Blue), 2.45 gram of photoinitiator (4-n-octyloxyphenyl)phenyliodonium hexafluoroantimonate), 0.5 grams of coalescing agent (2,2,4-trimethyl-1,3-pentanediolmono(2-methylpropanoate)), and 0.05 grams of bactericide. The components are mixed under high shear for 30 minutes.

Example 2

Preparation of a Hydrophilic Coating

A hydrophilic coating is prepared having the following components: 50 grams of 2-methylvinyl 3',4'-epoxycyclohexylmethyl ether, 30 grams of polar diluent (1,4-butanediol mono vinylether), 10 grams of non-polar diluent (cyclohexene oxide), 5 grams of filler particles (aluminum oxide), 2 grams of pigment (Irgalite Blue), 2.45 gram of photoinitiator (4-n-octyloxyphenyl)phenyliodonium hexafluoroantimonate), 0.5 grams of coalescing agent (2,2,4-trimethyl-1,3-pentanediolmono(2-methylpropanoate)), and 0.05 grams of bactericide. The components are mixed under high shear for 30 minutes.

Example 3

Evaluation of Hydrophilic Property

The hydrophilic coating of Example 1 is coated on a glass surface and dried at room temperature. The surface is irradiated with UV light for 30 minutes. The surface free energy and the water droplet contact angle of the hydrophilic coating is measured as follows. A Zisman plotting method is employed for measuring surface free energy. The surface tension of various concentration of the aqueous solution of magnesium chloride is plotted along the X-axis and the contact angle in terms of cos q is plotted along the Y-axis. A graph with a linear relationship between the two is obtained. The graph is extrapolated such that the surface tension at contact angle 0° is measured and is defined as the surface free energy of the solid. The surface free energy of the glass surface measured will be 84 milliNewton/meter.

Example 4

Evaluation of Hydrophilic Coating

The hydrophilic coating of Example 2 is coated on a glass substrate surface and dried at room temperature. The surface is irradiated with UV light for 30 minutes and evaluated for the following properties.

Hydrophilicity: The water droplet contact angle in air is measured by using DropMaster 500 (Kyowa Interface Science Co., Ltd) and will be 10°.

Water resistance: The hydrophilic coating is subjected to a rubbing treatment with sponge in 10 reciprocations in water while applying a load of 1 kg, and the amount of residual film is calculated from a change of weight before and after the rubbing treatment. The weight of the residual film will be 99% of the initial weight before rubbing.

Weather resistance: The hydrophilic coating is exposed in a chamber to a xenon arc lamp that is calibrated to mimic the sun spectral characteristics. The exposure is performed for 500 hours and is evaluated for hydrophilicity, water resistance and durability. The hydrophilic coating will exhibit same properties before and after the exposure.

Example 5

An Object Coated with Hydrophilic Paint

A metal table is painted with a hydrophilic coating of Example 2 and is allowed to dry at room temperature. The surface is irradiated with UV light for 30 minutes. The surface free energy of the table is measured as explained in Example 3 and will be 85 milliNewton/meter. The self-cleaning property of the coating is measured as follows: A line is drawn on the above mentioned coated table using oily ink. A similar line is also drawn on a table which is coated with a coating without hydrophilic properties. An uncoated table is also used in this experiment. A water jet is continuously applied on all three surfaces and periodically checked whether the oily line is still present. The oily ink applied on the table with coating of Example 2 will be erased after about 1 minute, whereas the oily line on the un-coated table or on the table with coating lacking hydrophilic properties will be un-changed and visible.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (example, bodies of the appended claims) are generally intended as "open" terms (example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A hydrophilic coating composition comprising:
about 40 wt. percent to about 95 wt. percent of a vinyl ether compound, an epoxide compound, a compound with vinyl ether and epoxy functional groups, or any combination thereof, wherein:
the vinyl ether compound is selected from the group consisting of a polyether vinyl ether, a polyacrylate vinyl ether, a polyester vinyl ether, a polycarbonate vinyl ether, a polybutadiene vinyl ether, a polyisopropylene vinyl ether, a polyurethane vinyl ether, a polyimide vinyl ether, a polyamide vinyl ether, a polyphosphazene vinyl ether, a siloxane vinyl ether, or any combination thereof,
the epoxide compound is selected from the group consisting of neopentylglycol di(4-methyl-3,4-epoxycyclohexanecarboxylate), 4-benzyloxymethylcyclohexane oxide, 1,2-epoxy-3-phenoxypropane, epoxidized 1,2,3-tris(1-propenoxy)propane, benzyl 3,4-epoxycyclohexylmethyl ether, 3,4-epoxycyclohexylcarboxaldehyde dibenzyl acetal, or any combination thereof, and
the compound with vinyl ether and epoxy functional groups is selected from the group consisting of 2-methylvinyl 3',4'-epoxycyclohexylmethyl ether, 2-methylvinyl 3',4'-epoxy-6'-methylcyclohexylmethyl ether, 2-methylvinyl 3'-methyl-3',4'-epoxycyclohexyl-dimethylmethyl ether, 2-methylvinyl 5',6-epoxy-2'-norbomylmethyl ether, or any combination thereof;
about 0.1 wt. percent to about 40 wt. percent of at least one polar diluent, wherein the at least one polar diluent is a low molecular weight vinyl ether monomer with at least one polar functional group, a low molecular weight epoxide monomer with at least one polar functional group, or any combination thereof;
about 40 wt. percent or less of at least one non-polar diluent;
about 0.5 wt. percent to about 12 wt. percent of at least one photoinitiator; and
about 2 wt. percent to about 10 wt. percent of a pigment, and
wherein the hydrophilic coating composition is configured to have polar groups covering about 1 percent to about 10 percent of a coated surface after being cured.

2. The hydrophilic coating composition of claim 1, wherein the at least one polar diluent is 1,4-butanediol mono vinylether, ethylene glycol mono vinyl ether, diethylene glycol mono vinyl ether, 4-(hydroxylmethyl)cyclohexylmethyl vinyl ether, glycidol, N-vinyl pyrrolidone, N-vinyl caprolactam, vinyl imidazole, vinyl methyacetamide, or any combination thereof.

3. The hydrophilic coating composition of claim 1, wherein the at least one non-polar diluent is cyclohexene oxide, 1,2-epoxyhexane, 1,2-epoxyoctane, 1,2-epoxydecane, 1,2-epoxyhexadecane, 1,2-epoxyoctadecane, epichlorohydrin, styrene oxide, ethyl vinyl ether, n-butyl vinyl ether, isobutyl vinyl ether, t-butyl vinyl ether, cyclohexyl vinyl ether, 2-ethylhexyl vinyl ether, 1,4-butanediol divinylether, epichlorohydrin, styrene oxide, or any combination thereof.

4. The hydrophilic coating composition of claim 1, wherein the at least one photoinitiator is a cationic photoinitiator selected from the group consisting of a diaryliodonium salt, a triarylsulphonium salt, a triarylselenonium salt, a dialkylphenacylsulphonium salt, an aryloxydiarylsulphoxonium salt, a dialylphenacylsulphoxonium salt, or any combination thereof.

5. The hydrophilic coating composition of claim 1, wherein the at least one photoinitiator is a cationic photoinitiator selected from the group consisting of (4-noctyloxyphenyl)phenyliodonium hexafluoroantimonate, (4-n-undecyloxyphenyl)phenyliodonium hexafluoroantimonate, bis(4-dodecylphenyl)iodonium hexafluoroantimonate, iodonium (4-methylphenyl) [4-(2-methylpropyl) phenyl]-hexafluorophosphate(1-), tris(4-alkylphenyl)sulfonium hexafluorophosphate, or any combination thereof.

6. The hydrophilic coating composition of claim 1, wherein the polar group on the coated surface is an amide, a carboxyl, a carbonyl, a hydroxyl, or any combination thereof.

7. The hydrophilic coating composition of claim 1, further comprising a filler present from about 2 wt. percent to about 40 wt. percent.

8. The hydrophilic coating composition of claim 1, further comprising at least one of a coalescing agent, a rheology modifier, a plasticizer, a surfactant, or any combination thereof.

9. The hydrophilic coating composition of claim 1, wherein the hydrophilic coating composition does not comprise a solvent.

10. The hydrophilic coating composition of claim 1, wherein the hydrophilic coating composition does not comprise a volatile solvent.

11. The hydrophilic coating composition of claim 1, wherein the hydrophilic coating is a decorative coating, an industrial coating, a protective coating, a self-cleaning coating, or any combination thereof.

12. The hydrophilic coating composition of claim 1, wherein the hydrophilic coating is curable by UV radiation.

13. The hydrophilic coating composition of claim 12, wherein the UV radiation has a wavelength of about 200 nanometers to about 400 nanometers.

14. The hydrophilic coating composition of claim 1, wherein the hydrophilic coating is configured to produce a hydrophilic surface upon curing, and wherein the hydrophilic surface has a water contact angle of less than 20°.

15. A method of to modify a surface to a hydrophilic surface, the method comprising:
applying a coating composition to the surface to form a coated surface, wherein the coating composition comprises:
about 40 wt. percent to about 95 wt. percent of a vinyl ether compound, an epoxide compound, a compound with vinyl ether and epoxy functional groups, or any combination thereof, wherein:
the vinyl ether compound is selected from the group consisting of a polyether vinyl ether, a polyacrylate vinyl ether, a polyester vinyl ether, a polycarbonate vinyl ether, a polybutadiene vinyl ether, a polyisopropylene vinyl ether, a polyurethane vinyl ether, a polyimide vinyl ether, a polyamide vinyl ether, a polyphosphazene vinyl ether, a siloxane vinyl ether, or any combination thereof,
the epoxide compound is selected from the group consisting of neopentylglycol di(4-methyl-3,4-epoxycyclohexanecarboxylate), 4-benzyloxymethyl cyclohexane oxide, 1,2-epoxy-3-phenoxypropane, epoxidized 1,2,3-tris(1-propenoxy)propane, benzyl 3,4-epoxycyclohexylmethyl ether, 3,4-epoxycyclohexylcarboxaldehyde dibenzyl acetal, or any combination thereof, and the compound with vinyl ether and epoxy functional groups is selected from the group consisting of 2-methylvinyl 3',4'-epoxycyclohexylmethyl ether, 2-methylvinyl 3',4'-epoxy-6'-methylcyclohexylmethyl ether, 2-methylvinyl 3'-methyl-3',4'-epoxycyclohexyl-dimethylmethyl ether, 2-methylvinyl 5',6-epoxy-2'-norbornylmethyl ether, or any combination thereof;

about 0.1 wt. percent to about 40 wt. percent of at least one polar diluent, wherein the at least one polar diluent is low molecular weight vinyl ether monomer with at least one polar functional group, a low molecular weight epoxide monomer with at least one polar functional group, or any combination thereof;

about 40 wt. percent or less of at least one non-polar diluent;

about 0.5 wt. percent to about 12 wt. percent of at least one photoinitiator; and about 2 wt. percent to about 10 wt. percent of a pigment; and exposing the coated surface to UV light to cure the coating composition, wherein the cured coating composition has polar groups covering about 1 percent to about 10 percent of the coated surface, and wherein the cured coating composition has a water contact angle of less than 20°.

16. The method of claim 15, wherein applying the coating composition comprises:

applying the coating composition comprising about 40 wt. percent to about 95 wt. percent of a vinyl ether compound or an epoxy compound, a compound with vinyl ether and epoxy functional groups, or a combination thereof, about 0.1 wt. percent to about 40 wt. percent of at least one polar diluent, wherein the at least one polar diluent is low molecular weight vinyl ether monomer with at least one polar functional group, a low molecular weight epoxide monomer with at least one polar functional group, or any combination thereof, about 40 wt. percent or less of at least one non-polar diluent, about 0.5 wt. percent to about 12 wt. percent of at least one photoinitiator selected from the group consisting of diaryliodonium salt, a triarylsulphonium salt, a triarylselenonium salt, a dialkylphenacylsulphonium salt, an aryloxydiarylsulphoxonium salt, a dialylphenacylsulphoxonium salt, or any combination thereof, and about 2 wt. percent to about 10 wt. percent of a pigment.

17. The method of claim 15, wherein applying the coating composition further comprises about 2 wt. percent to about 40 wt. percent of a filler.

18. The method of claim 15, wherein applying the coating composition to the surface comprises brushing, spraying, spreading, or rolling on the surface.

19. The method of claim 15, wherein applying the coating composition to the surface comprises applying the coating composition to a hydrophobic surface.

20. The method of claim 15, wherein exposing the coated surface to UV light comprises exposing the coated surface to UV light of about 200 nanometers to about 400 nanometers for about 5 minutes to about 5 hours.

21. A coated article, comprising:
a substrate; and
a coating disposed on at least one surface of the substrate, wherein the coating comprises about 40 wt. percent to about 95 wt. percent of a vinyl ether compound, an epoxide compound, a compound with vinyl ether and epoxy functional groups, or any combination thereof, wherein:

the vinyl ether compound is selected from the group consisting of a polyether vinyl ether, a polyacrylate vinyl ether, a polyester vinyl ether, a polycarbonate vinyl ether, a polybutadiene vinyl ether, a polyisopropylene vinyl ether, a polyurethane vinyl ether, a polyimide vinyl ether, a polyamide vinyl ether, a polyphosphazene vinyl ether, a siloxane vinyl ether, or any combination thereof, the epoxide compound is selected from the group consisting of neopentylglycol di(4-methyl-3,4-epoxycyclohexanecarboxylate), 4-benzyloxymethylcyclohexane oxide, 1,2-epoxy-3-phenoxypropane, epoxidized 1,2,3-tris(1-propenoxy)propane, benzyl 3,4-epoxycyclohexylmethyl ether, 3,4-epoxycyclohexylcarboxaldehyde dibenzyl acetal, or any combination thereof, and the compound with vinyl ether and epoxy functional groups is selected from the group consisting of 2-methylvinyl 3',4'-epoxycyclohexylmethyl ether, 2-methylvinyl 3',4'-epoxy-6'-methylcyclohexylmethyl ether, 2-methylvinyl 3'-methyl-3',4'-epoxycyclohexyl-dimethylmethyl ether, 2-methylvinyl 5',6-epoxy-2'-norbornylmethyl ether, or any combination thereof;

about 0.1 wt. percent to about 40 wt. percent of at least one polar diluent, wherein the at least one polar diluent is low molecular weight vinyl ether monomer with at least one polar functional group, a low molecular weight epoxide monomer with at least one polar functional group, or any combination thereof;

about 40 wt. percent or less of at least one non-polar diluent;

about 0.5 wt. percent to about 12 wt. percent of at least one photoinitiator; and about 2 wt. percent to about 10 wt. percent of a pigment, and wherein the coating is configured to have polar groups that cover about 1 percent to about 10 percent of a coated surface after being cured.

22. The coated article of claim 21, wherein the at least one photoinitiator is a cationic photoinitiator selected from the group consisting of a diaryliodonium salt, a triarylsulphonium salt, a triarylselenonium salt, a dialkylphenacylsulphonium salt, an aryloxydiarylsulphoxonium salt, a dialylphenacylsulphoxonium salt, or any combination thereof.

23. The coated article of claim 21, wherein the coating is configured to produce a hydrophilic surface upon the curing, wherein the hydrophilic surface has a water contact angle of less than 20°.

* * * * *